United States Patent Office 2,731,349
Patented Jan. 17, 1956

2,731,349

EDIBLE CONTAINER FOR ICE CREAM AND THE LIKE

Harry A. Toulmin, Jr., Dayton, Ohio, assignor to The Commonwealth Engineering Company of Ohio, Dayton, Ohio, a corporation of Ohio No Drawing. Application July 22, 1953,
Serial No. 369,741

10 Claims. (Cl. 99—88)

This invention relates to a container for ice cream, ices or the like.

In accordance with the invention there is provided a new, improved container designed especially, although not necessarily, to contain ice cream, which is edible and comprises substantially pure dextran.

Dextran is a high molecular weight polysaccharide characterized in that some, and apparently at least 50%, of the molecular structural repeating linkages joining the anhydroglucopyranosidic units are alpha-1,6 linkages, the remaining linkages being of non-alpha-1,6 type. Dextran may vary with respect to its physical properties, including its molecular weight, molecular structural repeating alpha-1,6 to non-alpha-1,6 linkages ratios, water-sensitivity and osmotic pressure in liquids.

The dextran used in making the edible containers of the invention has a molecular weight in the range of 5,000 to $150 \times 10^6$, as determined by light scattering measurements, a molecular structural repeating alpha-1,6 to non-alpha-1,6 linkages ratio in the range between 1.9:1 and 30:1, a solubility or dispersibility in water such as to yield stable aqueous solutions or dispersions of from 0.5% to 50% by weight concentration, and a colloidal osmotic pressure in liquids of from 1.0 mm. Hg. to 300 mm. Hg.

The dextran may be obtained microbiologically by inoculating with suitable selected bacteria, such as those of the *Leuconostoc mesenteroides* or *L. dextranicum* types, a sucrose-bearing medium containing particular nitrogenous substances and certain inorganic salts, and incubating the culture at the temperature most favorable to the growth of the particular microorganism. Thus, a suitable aqueous nutrient medium may contain, in percent by weight, 5–10 sucroes, 2 corn steep liquor, 0.5 monobasic potassium phosphate, 0.002 manganous sulfate and 0.50 sodium chloride. The medium is adjusted to a pH between about 6.5 and about 7.5, preferably about 7.2, and sterilized. The material is cooled to room temperature and inoculated with a culture of *Leuconostoc mesenteroides* B–512 (Northern Regional Research Laboratory classification) and incubated at 20° C. to 30° C. (optimum 25° C.) until a maximum yield of dextran has been attained; normally a period of between 12 and 48 hours will be satisfactory. The fermented product is a thick turbid liquid.

Upon completion of the fermentation which process renders the material acid, that is to a pH of 3.5–5.5 (average 4.2), calcium chloride is added to the fermentate to adjust the pH thereof to about 7.0 to 8.0. This aids in the precipitation of phosphates. Thereafter, acetone or alcohol, which may be a water-miscible lower aliphatic alcohol such as methyl, ethyl or isopropyl, is added in sufficient quantity to precipitate the dextran and this brings down, with the dextran, occluded and adsorbed bacteria and nitrogenous and inorganic elements. To occasion complete precipitation of the dextran it may be desirable to allow the mix to stand for a relatively long period, such as about 6 hours. The precipitated dextran, freed in any suitable way of the contaminants or impurities precipitated with it from the fermentate, may be dried in any appropriate manner. It may be drum-dried to obtain a product capable of being reduced to powdered condition, or a finely divided or pulverized product may be obtained by spray-drying or by lyophilization. The proportion of contaminants precipitated from the fermentate with the dextran may be held to a minimum by adding the lower aliphatic alcohol to the fermentate at a pH between about 2.5 and 4.5. The purer dextran thus obtained may be purified still further by one or more re-precipitations with the alcohol, freed of the precipitant, dried and reduced to powdered condition.

The dextran obtained by the procedure described is a "native" dextran, readily soluble in water, having a high average molecular weight (above 500,000), and characterized by a high percentage of alpha-1,6 linkages, the alpha-1,6 to non-alpha-1,6 molecular structural repeating linkages ratio being 19:1.

The edible container of this invention may comprise this "native" dextran or readily water-soluble dextran having a high average molecular weight similar to or approximating that of the "native" B–512 dextran but obtained under other conditions, such as that obtained using the microorganisms bearing the following NRRL classifications: *Leuconostoc mesenteroides* B–119; B–1146 and B–1190.

Edible containers according to the invention may also be made from "native" high average molecular weight dextran obtained using the microorganisms bearing NRRL classifications: *Leuconostoc mesenteroides* B–742, B–1191, B–1196, B–1208, B–1216, B–1120, B–1144, or B–523, *Streptobacterium dextranicum* B–1254 or *Betabacterium vermiforme* B–1139.

Dextran having the presently preferred moderate to high molecular structural repeating alpha-1,6 to non-alpha-1,6 linkages ratio in the range 10:1 to 30:1 is obtained, for example, using the microorganisms *Leuconostoc mesenteroides* B–119, B–512, B–1146–M, B–1190, B–1119, B–1208, B–1216 and the dextran-producing enzymes obtained by cultivating these microorganisms in a suitable medium and precipitating the enzyme from the medium.

Dextran having an average molecular weight lower than that of a "native" dextran, i. e., dextran having average molecular weight as low as 5,000, may also be used in making the edible containers. The dextran of the relatively low average molecular weight, e. g., in the range 5,000 to 500,000, may be obtained under any suitable conditions as by acid or enzymatic hydrolysis of higher molecular weight dextran.

The dextran used in making the edible container is not limited by the particular set of conditions or use of any particular microorganism in producing it so long as it has properties in the ranges given herein. It may be produced enzymatically, in the substantial absence of bacteria, by cultivating an appropriate microorganism such as *Leuconostoc mesenteroides* B–512 or B–119 to obtain a dextran-producing enzyme, separating the enzyme from the medium in which it is produced, and introducing the enzyme into a medium in which dextran is produced by the action of the enzyme. Also, the dextran may be obtained by bacterial conversion of 1,4 linkages of dextrin to 1,6 linkages of dextran, or in any other suitable manner.

In manufacturing the container, the usual procedures may be followed except that the farinaceous or cereal matter normally employed is substituted in whole or in part by the powdered dextran. For example, 100 lbs. of the powdered dextran may be mixed with 20 lbs. of powdered sugar and 10 lbs. of powdered milk to impart the desired sweetness, taste and texture to the mix, the mixing being continued, for instance in a dough mixer, and in the presence of sufficient edible plasticizer such as a sparing amount of water or oleaginous substance, to give a moldable plastic mass. This mass or batter is poured or otherwise placed in the holding tanks from which it is distributed as required to a series of molds of desired shape in an oven, the molding machine and baking technique being conventional. After baking in the usual manner, the crisp, rigid containers are removed from the molds.

The moldable mix may be modified in various ways. Thus the amount of sugar may be increased or decreased to increase or lessen the sweetness of the molded form. Also, various flavoring ingredients, such as vanilla extract, may be incorporated in the mass. In addition, the mass or batter may contain a small amount of salt to taste, and an amount of vegetable or other edible or certified U. S. coloring matter to impart a desired tint or color to the container. For example, one pound of caromel coloring mixture may be kneaded with the dextran and other ingredients. In making ice cream cones and the like, it is usual to include in the batter a small amount of baking powder, or sodium bicarbonate which furnishes, during the baking, carbon dioxide, the evolution of the gas serving to increase the porosity of the final molded product. Those substances, or other physiologically harmless materials which evolve gas at the baking temperature for the mix may be included in the dextran-containing batter.

Instead of using dextran alone, it may be used in combination iwth finely divided or pulverized farinaceous cereal matter, for example, wheat flour, in amounts varying from 5 to 95% by weight, based on the combined weight of the dextran and farinaceous material. Mixtures containing at least 50% of the dextran may be preferred.

When an edible oleaginous material, such as cocoa butter or other fat or fatty oil is used to plasticize the ingredients and facilitate thorough commingling thereof, the plasticizer enhances the moisture-repellency of the molded form, and assists in maintaining the crispness and rigidity of the form in contact with melted ices or ice cream when the form is exposed to high humidities. When such plasticizers are omitted and water only is used, or even when the oleaginous plasticizer is employed, it may be desirable to spray or otherwise coat the walls of the final molded container with an edible moisture-repelling liquid of the type used conventionally for increasing the moisture resistance of containers of this type.

Dextran is particularly suited to use in edible containers of this kind, being a bland, non-toxic, non-irritating material which is both tasteless and odorless. The dextran of biological origin is a natural substance which is assimilable without harm to human beings.

The cones comprising or consisting essentially of dextran is a crisp, frangible, light structure which can be nested to form a stack of cones without wedging or sticking and without crumbling at the top edge or mouth. The container may have any shape and size depending on the mold into which the batter or plastic mass is introduced for baking at moderate temperatures, preferably in the range of 50 to 85° C. Cones, cups or cornucopia of special design may be made and may have an upper edge provided with a recess, pocket, or series of pockets extending downwardly from the upper edge for retaining syrup or fruit juice such as is used in making sundaes. Or cones may be made having an inner wall provided with a plurality of inwardly projecting lugs adapted to engage and retain the helping of ice cream or the like. The container may have a special or fancy shape, such as a basket, fluted shell, dish provided with edible lid, etc. Also, the dextran-containing batter may be molded and baked in the form of wafers for use in making ice cream sandwiches, two of such wafers constituting, in effect, a container for ice cream disposed therebetween. The container may be used for ice cream, ices, frozen custard, sundaes, and other similar frozen comestibles or confections, and may also take the form of a cup for frozen pop sticks.

After removal from the mold, the container may be refrigerated, if desired.

While dextran is edible and assimilated without untoward effect on the human system, it appears that the alpha-1,6 linkages thereof are resistant to attack by bacteria and enzymes present in the gastro-intestinal tract and that, as described in the pending application of L. J. Novak, filed July 15, 1953, Ser. No. 368,028, that dextran having a high average molecular weight and a moderate to high molecular structure repeating linkages ratio in the range 10:1 to 30:1 functions to regulate or prevent gains in body weight by retarding or controlling the rate at which undigested food nutrients present in the gastro-intestinal tract are assimilated and absorbed. The dextran tends to dissolve in water present in the gastro-intestinal tract and to form a protective film on the undigested food particles or droplets, which film must be degraded before the food elements shielded thereby are accessible to attack by the enzymes, and as the film comprises dextran containing the high proportion of enzyme-resistant alpha-1,6 linkages, depolymerization proceeds slowly with consequent slow assimilation and absorption of the food resulting in control and inhibition of the rate of increase in body weight due to the assimilation and absorption of the food. Either assimilation and absorption of the food elements is retarded and there is time for the energy created by the assimilation and absorption to be expended in the course of normal activities without accumulation or storage as excess fat, or the food elements are only partially assimilated and absorbed. In any event, biological tests have demonstrated that when dextran containing the high proportion of alpha-1,6 linkages is included in normal diet, on a regular regimen, gain in body weight is inhibited. It can be expected, therefore that when ice cream or other normally fattening comestibles of that kind are consistently consumed with edible containers consisting essentially of dextran having the moderate to high molecular structural repeating linkages ratios, the gain in weight which may normally result from the consumption of ice cream will be less noticeable. By "consisting essentially" of dextran is meant containers the main or primary wall-forming ingredient of which is dextran.

It will be understood that while certain specific embodiments of the invention have been described, it is not intended to be limited or circumscribed by the specific details given since the invention is susceptible of variations and modifications which are within the scope of the disclosure and of the appended claims.

I claim:

1. A shaped edible container for frozen comestibles, the walls of said container comprising a substantially preponderant amount of pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

2. An edible ice cream cone the wall of which comprises a substantially preponderant amount of pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

3. An edible cup for ice cream, the walls of said cup comprising a substantially preponderant amount of pure dextrane having a molecular weight in the range of 5000 to $150 \times 10^6$, as determined by light scattering measurements, a molecular structural repeating alpha-1,6 to nonalpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

4. A shaped edible container for frozen comestibles, the walls of said container consisting essentially of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

5. An edible cup for ice cream, the walls of said cup consisting essentially of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

6. An edible wafer for making ice cream sandwiches, said wafer comprising a substantially preponderant amount of pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

7. An edible wafer for making ice cream sandwiches, said wafer consisting essentially of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg.

8. A shaped edible container for frozen comestibles, the walls of said container being formed from a mixture of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg and finely divided farinaceous material, the dextran being present in the mixture in a substantially preponderant amount.

9. An edible ice cream cone the wall of which is formed from a mixture of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg, and finely divided farinaceous material, the dextran being present in the mixture in a substantially preponderant amount.

10. An edible cup for ice cream, the wall of said cup being formed from a mixture of substantially pure dextran having a molecular weight in the range of 5000 to $150 \times 10^6$, as determined by light scattering measurements, a molecular structural repeating alpha-1,6 to non-alpha-1,6 linkages ratio in the range between 1.9:1 and 30:1, dispersible in water to yield stable aqueous dispersions of from 0.5% to 50% by weight concentration, and having a colloidal osmotic pressure in liquids of from 1.0 mm. Hg to 300 mm. Hg, and finely divided farinaceous material, the dextran being present in the mixture in a substantially preponderant amount.

References Cited in the file of this patent

UNITED STATES PATENTS

| | | |
|---|---|---|
| 2,089,217 | Mahoney | Aug. 10, 1937 |
| 2,409,816 | Wadsworth | Oct. 22, 1946 |
| 2,694,012 | Washburn | Nov. 9, 1954 |